United States Patent [19]

Salmon

[11] 4,072,213

[45] Feb. 7, 1978

[54] SUSPENDED CABLE APPARATUS

[75] Inventor: John Kennedy Salmon, Mendham, N.J.

[73] Assignee: Otis Elevator Company, New York, N.Y.

[21] Appl. No.: 713,083

[22] Filed: Aug. 9, 1976

[51] Int. Cl.² .................................................. F16F 7/10

[52] U.S. Cl. .................................... 188/1 B; 187/1 R

[58] Field of Search ........................... 174/42; 188/1 B; 187/1 R; 248/18, 20, 358 R; 254/190 R

[56] References Cited

U.S. PATENT DOCUMENTS

| | | | |
|---|---|---|---|
| B 436,724 | 2/1976 | Shigeta et al. | 187/1 R |
| 1,145,213 | 7/1915 | Remané | 188/1 B X |
| 2,859,836 | 11/1958 | Wiener | 188/1 B |
| 3,430,902 | 3/1969 | Lohr | 188/1 B X |

*Primary Examiner*—Duane A. Reger
*Attorney, Agent, or Firm*—Robert T. Mayer

[57] ABSTRACT

A suspended cable apparatus for damping the vibration in a cable includes a mechanism mounted a predetermined distance from the structure from which the cable is suspended. The mechanism includes a deflecting means which is movable and which deflects the cable. Cable vibration causes the deflecting means to move and to cause more motion in the cable at its point of engagement with the cable deflecting means than would occur in the absence of the deflecting means.

12 Claims, 9 Drawing Figures

SUSPENDED CABLE APPARATUS

This invention relates to suspended cable apparatus in which the cable is subject to vibratory motion. More particularly it concerns apparatus for damping vibrations which may occur in such suspended cables.

Suspended cable systems have an undesirable tendency to vibrate. For example, electrical power transmission is performed by horizontally suspended cables which are openly exposed to wind disturbances and sway as a result. Such sway or vibration causes excessive fatigue and a danger of possible breakage. Hoisting apparatus also utilize suspended cables which undesirably experience vibration. For example, a crane can have a boom whose orientation is changed by means of a cable. During operation of the crane this cable can experience vibratory motion.

Elevators are a class of hoisting apparatus which employs numerous suspended cables. Each traction elevator includes hoisting cables by which the elevator car and counterweight are suspended over a drive sheave to be driven thereby. Also many high rise elevator installations include a compensating cable suspended between the bottoms of an elevator car and its counterweight and arranged to pass under a compensating sheave located in the elevator pit. In addition hydraulic elevators as well as traction elevators include a traveling cable which is suspended between an elevator car and an electrical junction box to provide an electrical connection to the elevator car.

Problems associated with rope vibration can arise in modern high rise buildings which are constructed with curtain walls and have a lower concrete to steel ratio than older buildings. Such high rise buildings tend to sway or vibrate at specific frequencies with little damping in response to an external wind load. This vibrating of modern high rise buildings is troublesome since it can cause swaying of the elevator hoisting and compensating cables. Both of these cables typically comprise a number of closely spaced individual cables and such swaying can cause these individual cables to tangle with one another. Cable damage can result from such cables traveling around the drive sheave or compensating sheave in an entangled condition. This problem can be so severe with respect to compensating cables in an installation that it can cause severing of those cables.

All of the above mentioned suspended cables may exhibit a resonance phenomena. For example, a transmission line may respond to wind disturbances by vibrating at a relatively fixed frequency and with an amplitude which tends to increase. A suspended elevator cable possesses a fundamental natural frequency of vibration, the magnitude of which depends upon its length. Since modern high rise buildings tend to vibrate at one or more relatively fixed frequencies, large amplitudes of elevator cable sway can occur if the length of the cable is such as to produce a natural frequency near one of the relatively fixed frequencies of the building. It is further appreciated that a cable can vibrate a higher harmonics of the fundamental natural frequency.

There is known equipment for damping or preventing vibration in suspended cable systems. For example, it is known to hang a mass from a power transmission cable to change its vibrational characteristics. Damping may be provided by such equipment by coupling this mass to the transmission cable by means of an energy-absorbing dashpot. To be effective such equipment requires the mass to be suspended from a fixed point a significant distance from the point at which the transmission cable is terminated. Such systems are unsuitable for elevator usage in which the suspended cables must travel with the car and pass over a sheave.

Other known apparatus use a bell-shaped member which is attached to the terminating point of the suspended cable to encircle it. Upon the cable vibrating with sufficient severity it contacts this bell-shaped member. Such contact can damp cable vibration especially if the cable frictionally slides across the inside surface of this bell-shaped member. This bell-shaped member is mounted at the terminating point of the cable where the amplitude of cable vibration is small. Accordingly, the bell-shaped member is not able to extract much energy from the cable unless the cable vibration is so severe as to cause significant displacement near the cable terminating point.

In elevator systems in which a group of closely spaced parallel cables are suspended together, other equipment has been used. This equipment includes a flexible member affixed to one of the group of closely spaced cables to flexibly engage the remaining ones of the group of cables. A disadvantage arises with this apparatus since it must be mounted near the cable terminating point, that is, near the point at which the cable is attached to the elevator car or counterweight. Such mounting is necessary to prevent the flexible member from passing over the sheave along with the cable to which it is affixed and being damaged thereby. Near the cable's terminating point the amplitude of cable vibration is relatively small and flexible devices located near this point have limited effectiveness. Furthermore, this apparatus does not prevent the group of cables from swaying together as a unit.

It is an object of this invention to provide an improved suspended cable apparatus.

It is a further object of this invention to provide a suspended cable apparatus which dampens cable vibration by increasing the freedom of movement of the cable near its terminating point thereby causing significant cable motion near the cable terminating point which can then be effectively damped.

Still another object of the invention is to provide a deflecting means near the terminating point of a suspended cable to deflect the cable so that if it vibrates it travels an arcuate path without lifting the cable or changing the tension in it. Such a deflecting means does not bear the full tensile load of the cable but instead merely provides the relatively small force necessary to deflect the cable.

A feature of the preferred embodiment of the invention is its employment of an annular device which is mounted to encircle a suspended cable at a predetermined distance from one of its terminating points. This annular device has an arcuate track on its inside surface in which a cable deflecting means moves. This cable deflecting means bears upon the cable and deflects it from the path in which it would otherwise be suspended.

In carrying out the invention in the presently preferred embodiment the arcuate track of the annular device comprises a circular path in a plane perpendicular to the longitudinal path in which the cable would be suspended in the absence of the cable deflecting means. Also in the disclosed, constructed, preferred embodiment a guide frame including a plurality of wheels, some engaging the arcuate track others engaging the cable, facilitates this circular motion which the deflecting means experiences in response to vibration of the cable.

The center of the circular path of the annular device is aligned with the cable's terminating point so that the portion of cable between the annular device and the terminating point maintains a substantially fixed angle with respect to the above-mentioned longitudinal path in which the cable would be suspended in the absence of the deflecting means. The locus of movement of this portion of the cable in response to vibration is conical. For this reason there is no tendency for the cable to move in a direction along its length. Therefore neither changes in the tensile forces within the cable nor motion of the cable in a direction along its length occur.

It is also noted that the cable deflecting means is not rigidly fastened to the cable. This feature is important if the annular device is not precisely aligned as described above. With a misaligned annular device the cable tends to move in response to vibrations in a direction along its length at its location at the device, i.e. it tends to undergo lifting and lowering motions at the device. In such an arrangement the cable deflecting means, if rigidly fastened to the cable could under certain circumstances, have applied to it the entire tensile force in the suspended cable. To prevent the cable deflecting means from being damaged by such forces it would have to be constructed with sufficient capacity to sustain such loads if its cable were to be rigidly fastened to it. The embodiments of the invention disclosed herein avoid this aforementioned problem by permitting the cable to move freely with respect to the deflecting means. Another consequence of this is that changes in cable length caused by changes in load, aging, temperature variation, etc., does not increase the load sustained by the cable deflecting means.

In addition, the amplitude of cable motion in the annular device is greater than that which would exist in the absence of the cable deflecting means. The cable is damped by frictional losses inherent in any mechanical apparatus having moving parts. Furthermore deflecting the suspended cable in different directions is expected to produce hysteresis losses in the cable.

Another feature of the presently preferred embodiment of the invention is the mounting of a protective member on the cable at a given distance from the annular device.

Mounted around this protective member is a restraining plate having an aperture in it. As the cable experiences vibratory motion, the protective member on the cable moves and rubs against the sides of the aperture. This produces direct damping of the suspended cable.

A further feature of the present invention is the provision of a dashpot device mounted proximate the annular device. This dashpot device has two relatively movable members. One of these members is coupled to the cable and the other is attached to a mounting means upon which both the annular device and the dashpot devices are mounted. This dashpot device operates to produce a restraining force which damps the vibratory motion of the cable. In the preferred embodiment two dashpots are mounted to produce restraining forces substantially at right angles to one another although it is understood that an alternate embodiment could operate satisfactorily with a single dashpot.

In an alternate embodiment of the present invention an annular cup encircles and forms a seal with the annular device thereby providing a reservoir between the inside surface of the cup and the outside surface of the annular device. The annular device in this embodiment is supported by an annular support having a lip which extends through the reservoir and slidably engages a groove in the annular device. The reservoir is filled with a liquid medium which damps relative motion between the annular device and the annular support. Since this relative motion is produced by vibratory motion of the cable, the vibratory motion of the cable is damped.

In another alternate embodiment of the present invention a rotor is rotatably mounted within the annular device. This rotor has an eccentric hole through which a suspended cable passes. As the entrapped cable moves in a circular path the rotor rotates. The effectiveness of this embodiment can be enhanced by using additional equipment spaced from the above-mentioned rotor in a direction along the length of the cable to provide further damping. To this end a first hub is rotatably mounted on a horizontal mounting platform located a given distance from the above-mentioned rotor. Rotatably and eccentrically mounted within this first hub is a second hub having an eccentric opening through which the cable passes.

A linkage means is connected between the above-mentioned rotor and first hub. This linkage means is arranged to cause the rotor and first hub to rotate synchronously. As a result motion imparted to the rotor and first and second hub does not raise and lower the cable. This embodiment therefore is not designed and constructed with the ability to perform the function of lifting and lowering the cable, either.

According to the present invention a suspended cable apparatus is provided for damping vibration of a cable suspended from a structure. This apparatus includes a mounting means attached to the structure which extends a given distance from the structure along the length of the cable. Also included is a mechanism mounted on the mounting means and including cable deflecting means engaging the cable. The cable deflecting means when located in a predetermined position deflects the cable from the longitudinal path in which it would be suspended in the absence of the cable deflecting means. The cable deflecting means is movable in response to cable vibration and controls the portion of the cable at its location of engagement with the cable deflecting means to move in response to predetermined cable vibration with more motion that the portion would move in the absence of the cable deflecting means.

Other objects and features of the invention will be apparent from the foregoing and the following description when considered in conjunction with the appended claims and the accompanying drawing in which:

It is to be understood that to facilitate the disclosure of the invention the elevator system in which the invention is illustrated is much simpler than would be found in a commercial installation. However from the disclosure those skilled in the art will clearly understand how to practice the invention.

Figure 1:
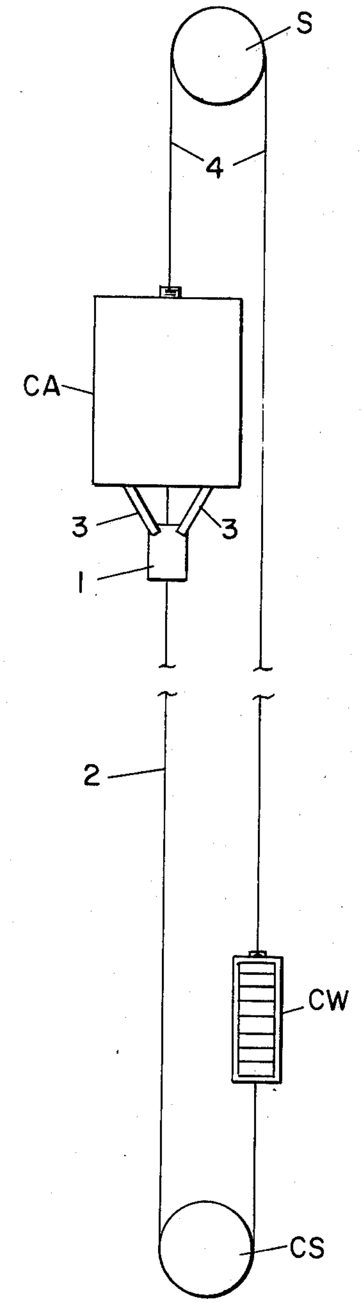
FIG. 1 is a generalized representation of the suspended hoisting and compensating cables in an elevator system showing the location of damping apparatus in the disclosed embodiment of the present invention.

Referring to FIG. 1 a simplified suspended cable system as used in a conventional elevator system is illustrated along with additional apparatus in accordance with the present invention. As shown, elevator car CA is suspended from one end of hoisting cable 4 which is driven by a sheave S. Car CA is counterbalanced by counterweight CW suspended from the opposite end of hoisting cable 4. Compensating cable 2 is suspended below car CA. It passes through enclosure 1 around compensating sheave CS and is terminated at the bottom of counterweight CW. Enclosure 1 is mounted below car CA by means of mounting struts 3. Mounted inside enclosure 1 is apparatus constructed according to the present invention. In addition to operating as a dust cover, enclosure 1 forms part of the mounting means of the present invention. Car CA comprises a structure from which cable 2 is suspended.

Figure 2:
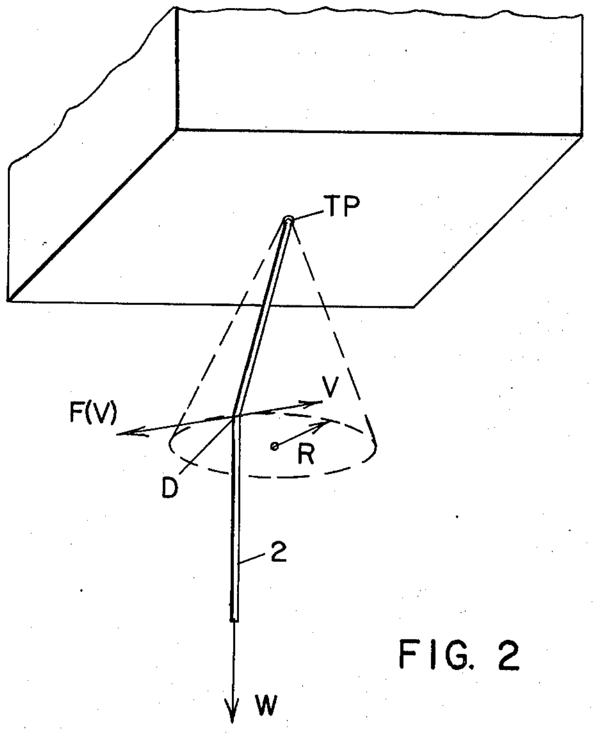
FIG. 2 is a free body diagram of a suspended cable deflected in accordance with the preferred embodiment of the present invention.

FIG. 2 is a free body diagram showing cable 2 deflected distance R. The dotted lines illustrate a cone which is the locus of possible cable positions in the preferred embodiment. A velocity vector V is shown tangential to the base of this cone. A restraining force F($v$) is shown opposing it. The force applied by compensating sheave CS tending to pull cable 2 downwardly is illustrated as vector W.

Figure 3:
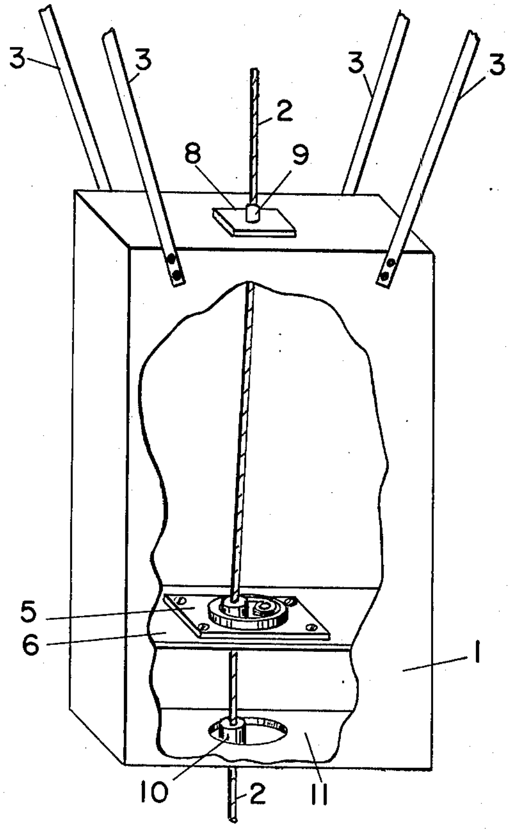
FIG. 3 represents the general location of major portions of apparatus of the preferred embodiment of the present invention.

FIG. 3 represents the general arrangement of several components in the constructed preferred embodiment. In this embodiment compensating cable 2 passes through aluminum enclosure 1 which is supported by aluminum mounting struts 3. Mounting struts 3 together with enclosure 1 form part of the mounting means of the invention. A face of enclosure 1 is broken for purposes of illustration so that its contents are visible. It is to be understood that in an actual installation a number of compensating cables similar to cable 2 would be provided. Each would have apparatus associated with it similar to the apparatus associated with cable 2. In the constructed embodiment cable 2 is clamped in fixture 8 thereby restraining the cable at a known point. Collar 9 surrounds cable 2 and prevents abrasion thereof.

Figure 4:
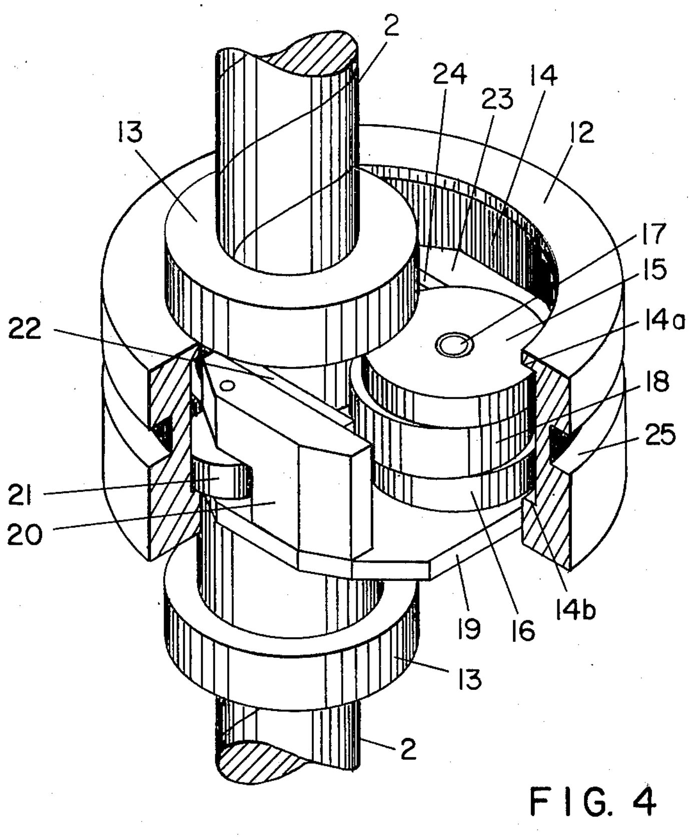
FIG.4 is a detailed drawing of an annular device and cable deflecting means in accordance with the preferred embodiment of the present invention.

Within enclosure 1 an annular device and cable deflecting means (to be described in detail hereinafter) is mounted on a horizontal base plate 5, approximately 36 inches below fixture 8. Base plate 5 is mounted on shelf 6 which is suitably secured to the inner walls of enclosure 1. Below shelf 6 nylon protective member 10 having a 3 inch outside diameter encircles and is clamped to cable 2 to be freely movable within a five inch circular aperture provided in bottom 11 of enclosure 1. In the constructed embodiment bottom 11 is 5½ inches below base plate 5 and its 5 inch circular aperture is aligned so that protective member 10 just clears the side of the aperture at one point if cable 2 is not vibrating. Vibrating motion of cable 2 causes member 10 to rub against the side of the aperture so that bottom 11 acts as a restraining member to restrain such motion. Bottom 11 and member 10 form a damping means. Referring to FIG. 4 a steel annular device 12 with part removed for purposes of illustration, is shown encircling cable 2 which has a steel protective collar 13 protecting it. Collar 13 is dimensioned to allow it and cable 2 to translate vertically and to twist within annular device 12. The upper and lower shoulders of collar 13 limit the extent of such movement and prevent it from sliding out of engagement with annular device 12. Annular device 12 has an arcuate track 14 formed on its inside surface by lips 14*a* and 14*b*. Tracking wheels 15 and 16 roll in track 14. Tracking wheels 15 and 16 are mounted on an elongated member 17 along with bearing member 18 which is another independently rotatable wheel. Bearing member 18 is arranged to bear upon protective collar 13 to deflect cable 2 from the center of annular device 12. In doing this member 18 does not engage arcuate track 14 of annular device 12.

Elongated member 17 is mounted in a keyed slot (not shown) in supporting plate 19 and is shaped similar to a crankshaft to provide a pair of aligned outer axis for tracking wheels 15 and 16 and an inner axle for bearing member 18. Also mounted on supporting plate 19 is aluminum block 20 and guide wheel 21. Block 20 provides support both for guide wheel 21 which engages track 14 in annular device 12 and also for nylon rubbing strip 22 which engages protective collar 13. Partially visible on the other side of protective collar 13 is aluminum block 23 and nylon rubbing strip 24 (more clearly illustrated in FIG. 5) which are mounted on supporting plate 19 symetrically with block 20 and strip 22. Rubbing strips 22 and 24, blocks 20 and 23, guide wheel 21, supporting plate 19, tracking wheels 15 and 16 and elongated member 17 are parts of the guide frame of the invention. This guide frame together with bearing member 18 form that part of the invention referred to as the deflecting means.

Annular device 12 has a circumferential groove 25 formed on its outside surfaces which is suitably shaped to mount the device on plate 5. Lip 14*b* overlaps the edges of tracking wheel 15 and guide wheels 21 and 26 and confines the deflecting means in annular device 12. In the constructed embodiment annular device 12 and protective collar 13 were split so that each were formed from two complementary halves which were suitably bolted together. This split arrangement facilitates installation of the present invention on a pre-existing elevator system. The details of such a split arrangement is not described herein to simplify the disclosure; it being understood that apparatus and techniques for providing such a split arrangement is within the skill of the art.

Figure 5:
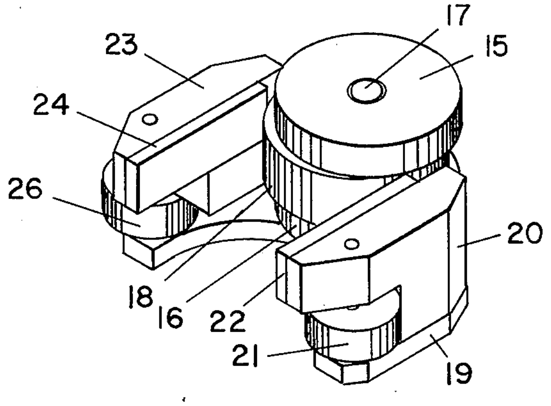
FIG. 5 is a detailed drawing of the cable deflecting means of FIG. 4.

Referring to FIG. 5, the above-mentioned deflecting means is illustrated separately. Supporting plate 19 is generally crescent shaped and dimensioned to fit within the annular device 12 of FIG. 4. Mounted on opposite sides of supporting plate 19 are blocks 20 and 23. Mounted on shafts journaled in plate 19 and blocks 20 and 23 are a pair of guide wheels 21 and 26, respectively. These guide wheels extend beyond the edges of supporting plate 19 and blocks 20 and 23 and engage the arcuate track 14 of annular device 12. Rubbing strips 22 and 24 are suitably fastened to blocks 20 and 23, respectively by screws (not shown). Elongated member 17 is perpendicularly mounted to support plate 22. As mentioned, this elongated member 17 is shaped to provide aligned axles for tracking wheels 15 and 16 and also for bearing member 18. The aligned axles provided for tracking wheels 15 and 16 are displaced relative to the axle provided for bearing member 18. When the guide frame is mounted within annular device 12, tracking wheels 15 and 16 engage arcuate track 14 on the inside surface of annular device 12 and bearing member 18 engages collar 13 which surrounds cable 2. Rubbing strips 22 and 24 also engage protective collar 13 surrounding cable 2 and maintain bearing member 18 in contact with the collar.

Figure 6:
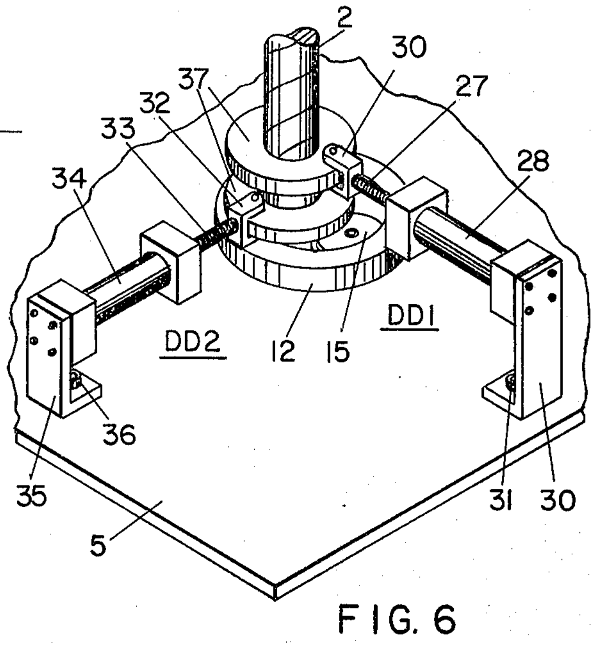
FIG. 6 is a representation showing an arrangement of dashpot devices which are used with the preferred embodiment of the present invention.

Referring to FIG. 6, an improved arrangement of the preferred embodiment is illustrated. This improved arrangement provides more damping of cable 2 than the previously described arrangement by employing dashpot devices. This improved arrangement employs the same elements as shown in FIGS. 4 and 5 except that collar 37 is formed with two surfaces upon which clevises 30 and 32 are pivotally mounted. Clevises 30 and 32 are spaced substantially 90° apart on the mounting surfaces of collar 37. Attached to clevises 30 and 32 are dashpot devices DD1 and DD2 each of which have members which are movable relatively with respect to each other. Dashpot device DD1 consists of plunger arm 27 which is movable with respect to cylinder body 28. Plunger arm 27 is connected to a piston inside cylinder body 28. Dashpot device DD1 is mounted on plate 5 by suitable attachment to bracket 30 which is pivotally mounted to base plate 5 for rotation horizontally by pivot 31.

Similarly dashpot device DD2 comprises plunger arm 33 movable within cylinder body 34. This device is suitably mounted on bracket 35 which is pivotally mounted to baseplate 5 for rotation horizontally by means of pivot 36. Pivots 31 and 36 allow dashpot devices DD1 and DD2 to follow motion of cable 2 in any direction.

In the constructed embodiment dashpot devices DD1 and DD2 are commercially available cylinders (Airoyal Part No. SPH 311-6) in which the input and output ports are connected together through a valve (not shown). These cylinders have a 2 inch stroke and a $\frac{3}{4}$ inch bore, and are filled with hydraulic transmission oil, SAE-10W approximately. The valve between the input and output ports renders the damping charactertistic of the cylinders adjustable, although it is to be understood that any dashpot device exhibiting a characteristic approximately as illustrated in the graph of FIG. 6A is suitable.

Figure 6A:
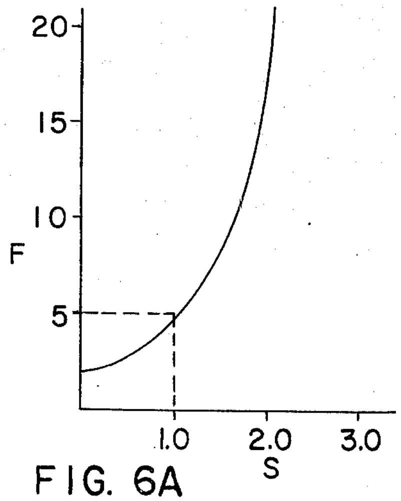
FIG. 6A is a graph showing the characteristics of the dashpots of FIG. 6.

The graph of FIG. 6A shows the relationship between the two relatively movable members of each dashpot device. The abscissa S represents the relative velocity between the relatively moving members in inches per second and the ordinate F represents the restraining force therebetween in pounds.

It may be desirable to use dashpot devices in some installations which have characteristics differing from that illustrated in graph 6A. In such installations it is contemplated that the dashpot selected should have a suitable characteristic which takes into account the expected period of vibration of the relevant elevator cables as explained subsequently herein as well as the cable's weight per unit length.

Figure 7:
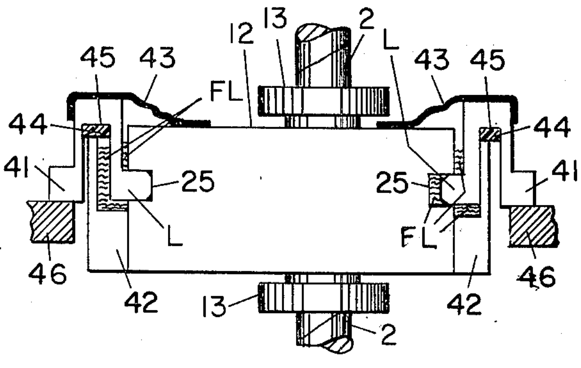
FIG. 7 shows a mounting arrangement of one alternate embodiment of the present invention.

Referring to FIG. 7 an alternate embodiment is shown in which previously mentioned annular device 12 is mounted on grooved annular support 41 which encircles annular device 12. Lip portion L of annular support 41 slidably engages groove 25 formed on the outside surface of annular device 12. Annular cup member 42 surrounds annular device 12 and forms a liquid-tight seal. An annular reservoir is thereby formed which is filled with liquid medium FL which viscously damps relative motion between annular support 41 and annular device 12. To keep liquid FL within its reservoir a boot 43 is placed over the vented portion of the reservoir between annular support 41 and annular device 12. Also for the purpose of containing liquid FL, a foam seal 44 shaped in a ring is inserted between annular cup member 42 and recessed groove 45 in annular support 41. This entire assembly is suitably mounted on base plate 46 which replaces and corresponds to base plate 5 of the preferred embodiment. Annular support 41 together with annular cup member 42 and liquid FL are part of a damping means which restrains relative motion between annular support 41 and annular device 12 resulting from vibratory motion of cable 2.

Figure 8:
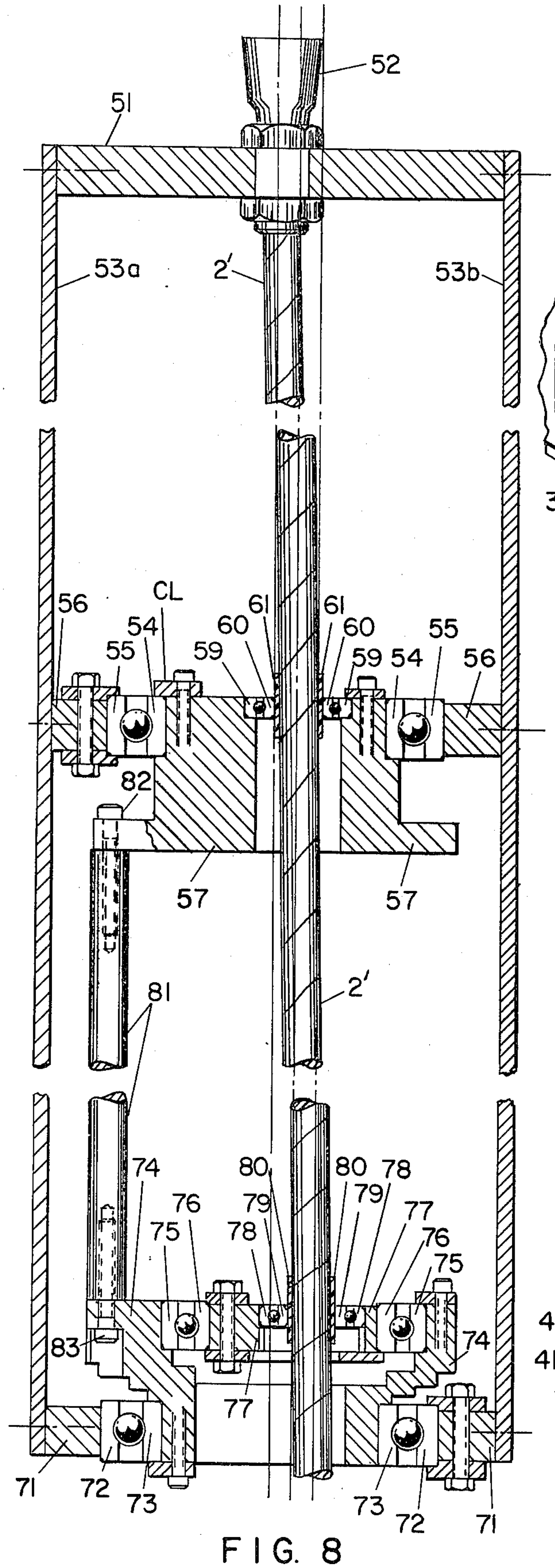
FIG. 8 represents another alternate embodiment of the present invention.

FIG. 8 shows another alternate embodiment using members rotatably mounted on ball bearing assemblies. In this embodiment cable 2′ is fastened to structure 51 by means of babbitted socket 52. Structure 51 corresponds to enclosure 1 of the preferred embodiment and similarly is suspended from the bottom of an elevator car. Only two side walls 53*a* and 53*b* of structure 51 are shown, the front and back walls are not illustrated to simplify the disclosure.

Side walls 53*a* and 53*b* comprise a mounting means used to support the various bearings and other devices mounted below babbitted socket 52. Inner race 54 and outer race 55 are part of a ball bearing assembly which is suitably clamped to annular plate 56 in a first upper circular aperture formed therein. Any suitable clamping means is judged satisfactory. In the disclosed embodiment three clamping means such as that identified as CL are employed. These are disposed in a triangular relationship around the perimeter of outer race 55.

Plate 56 is suitably supported from side walls 53*a* and 53*b* about 20 inches below structure 51. Inner race 54, in a suitable manner supports rotor 57 which has a second upper circular aperture which is eccentric to the first upper circular aperture of plate 56. In this embodiment the center of the second upper circular aperture is spaced $\frac{3}{8}$ inch from the center of the first upper circular aperture. Suitably mounted within the second upper circular aperture is a ball bearing assembly comprising outer race 59 and inner race 60. Within inner race 60 is a protective rubber sleeve 61 which yieldably engages cable 2′ allowing it to slide with respect to race 60. Inner race 54, rotor 57, ball bearing assembly 59, 60 and protective sleeve 61 are part of the cable deflecting means of this embodiment. Annular plate 56 and outer race 55 provide an arcuate track corresponding to the arcuate track provided by annular device 12 (FIG. 4). By this arrangement points on cable 2′ located between babbitted socket 52 and sleeve 61 are free to move in a path defining a conical surface.

The foregoing describes apparatus which operates to provide damping similarly to the apparatus of FIG. 4 and it is understood that in some installations no further equipment is required. However, the remaining equipment illustrated in FIG. 8 is included to provide additional damping.

Horizontal mounting platform 71 is a plate suitably supported from walls 53*a* and 53*b* approximately forty inches below structure 51. This plate has a first lower circular aperture in it within which a ball bearing assembly comprising outer race 72 and inner race 73 is suitably mounted. Supported on inner race 73, in a suitable manner, is first hub 74 which has a circular opening in it forming a second lower circular aperture. In this embodiment the center of this second lower circular aperture in first hub 74 is spaced ⅜ inch from the center of the first lower circular aperture in plate 71. The center of this second lower circular aperture is aligned with the center of cable 2' at sleeve 61. Suitably mounted within the second lower circular aperture is a ball bearing assembly comprising outer race 75 and inner race 76. Mounted within inner race 76, in a suitable manner, is second hub 77 having a third lower circular aperture eccentric to the second lower circular aperture with their respective centers spaced ⅜ inch apart. Suitably mounted within the third lower circular aperture in hub 77 is a ball bearing assembly comprising outer race 78 and inner race 79. Within inner race 79 is a protective rubber sleeve 80 which yieldably engages suspended cable 2 allowing it to slide with respect to race 79. Linkage means 81 is shown attached to both rotor 57 and to the first hub 74 by means of bolts 82 and 83 which are screwed into holes in both ends of linkage means 81. Linkage means 81 is so attached to maintain that portion of cable 2' within sleeve 61 vertically aligned with the center of the second lower circular aperture formed in first hub 74 throughout rotation of rotor 57 and hub 74.

An understanding of the general principles of operation of the present invention can be obtained by referring to the diagram of FIG. 2. The vertically suspended cable, illustrated therein, is discussed first since important principles can be readily understood from the arrangement. Those skilled in the art will understand from these principles how the invention applies to non-vertical system as well.

In FIG. 2, cable 2 is shown suspended from the bottom of elevator car CA. Cable 2 is deflected from the vertical such that it can be considered an element on a cone surface intersecting the cone's apex. This conical surface is illustrated by dotted lines, with the base of the cone forming a circle of radius R. In the preferred embodiment cable 2 is deflected so that it remains on this conical surface and accordingly, point D on cable 2 is free to traverse the circular path represented as the base of the cone in FIG. 2. It is to be understood that the forces the preferred embodiment must produce in operation are relatively small notwithstanding force W may be of considerable magnitude. The reason for this is that the embodiment need only produce forces capable of deflecting cable 2 so that point D is located on the circumference of the circle of radius R. It does not have to apply forces necessary to overcome all or any significant part of force W.

In the preferred embodiment the circular path of point D (FIG. 2) is in a horizontal plane. With such an arrangement the distance between point D and the terminating point TP on the bottom of car CA is constant as point D moves. As a result cable 2 does not experience any vertical translation as point D of cable 2 traverses its circular path. As a result in the disclosed preferred embodiment of the invention all of the energy generated in cable 2 owing to vibratory motion imparted to it is available for dissipation through motion of the deflecting means.

The deflecting means it is to be understood is near the cable terminating point at which point the amplitude of cable motion owing to vibration would be relatively small in the absence of the deflecting means. The deflecting means increases this relatively small amplitude of motion into the larger amplitude defined by the circular path of radius R. By moving cable 2 at this point of deflection more than it would move if not deflected, more energy generated by vibratory motion imparted to cable 2 can be extracted therefrom at the point of deflection than could otherwise be extracted at that point. Extracting energy in this manner damps the cable along its entire length.

It is contemplated that for some embodiments it may be desirable to bias the suspended cable to a predetermined position on the circular path of radius R, so that if the cable is not vibrating it will return to this known position. Such biasing can be useful when a plurality of spaced, parallel cables are suspended together. Biasing can be used to maintain a definite spacing between such cables if they are not vibrating.

Such biasing could be accomplished by causing point D on cable 2 to follow a circular path which is not horizontal. Such a path would cause the cable to seek its lowest position at rest. From the foregoing structural disclosure and the following operational description those skilled in the art will readily understand how to accomplish this.

The diagram of FIG. 2 considers suspended cable systems which perform vertical hoisting, such as an elevator system. The same principles however can be applied to systems in which the suspended cable is disposed in non-vertical directions, including horizontal. In these other suspended cable apparatus the weight of the cable itself may be a significant factor. For this reason the ideal path which a point on the suspended cable should follow will be arcuate but will not be necessarily circular. It is anticipated, however, that practical embodiments could, nonetheless, use a circular path. In any event, it is to be understood that the preferred embodiment of the invention, if employed on a non-vertical cable, will include an annular device which guides a deflecting means in an arcuate track in a plane perpendicular to the longitudinal path in which the cable would be suspended if undeflected.

The elevator cable apparatus of FIG. 1 will be considered for the balance of the description although it is understood that the apparatus subsequently described may be utilized for systems in which the suspended cable is oriented in directions other than vertical.

To fully understand the cable damping performed by the present invention, it is helpful to understand how cable vibration occurs in an elevator system. Elevator cables are suspended in buildings which tend to vibrate in response to external wind load. A tall building constructed with curtain walls derives its rigidity primarily from steel framework. For purposes of analysis such a building can be considered to respond like a tuning fork. Random wind forces can cause building vibration which is concentrated within a relatively narrow bandwidth located about a frequency which corresponds to a relatively fixed period of building vibration. Furthermore, such buildings vibrate randomly.

This random building vibration causes random vibration in the various elevator cables including hoist cable 4 and compensating cable 2 (FIG. 1). Furthermore, the elevator cables can resonate if their natural frequency matches the frequency at which the building is vibrating. This cable vibration is damped very little and it has been estimated to have a Q between 100 and 200. Accordingly, it is theoretically possible for a sustained building vibration having an amplitude of ± 1 inch to cause ± 200 inches of elevator cable sway. It should be noted that buildings have been measured vibrating with an amplitude of ± 5 inches.

In order to understand how the invention functions to damp cable sway produced by such building vibration, consider the preferred embodiment shown in FIGS. 4 and 5 which allows point D (FIG. 2) of cable 2 to freely follow a circular path. A protective collar 13 surrounds cable 2 to prevent abrasion as it is guided around this circular path. The circular path is provided by annular device 12 which, as explained, includes an arcuate track on the inside surface. It is noted preliminarily that the outside diameter of annular device 12 can be designed to facilitate its use with closely spaced parallel cables. In the constructed embodiment this outside diameter was $5\frac{3}{4}$ inches.

The apparatus shown in FIG. 5 contacts protective collar 13 at three points. The first of these is provided by bearing member 18, comprising a wheel which rotates on elongated member 17, and which applies most of the force which deflects cable 2 from the center of annular device 12 (FIG. 4). Also, rubbing strips 22 and 24 contact collar 13 (FIG. 4). Collar 13 is dimensioned so that it cannot move within annular device 12 without moving the deflecting means separately illustrated in FIG. 5. For this purpose, the center of bearing member 18 is maintained aligned with the center of cable 2 so that both centers always lie along a diameter of annular device 12. Forces transmitted to bearing member 18 along a radius of annular device 12 cause reactive forces to bear on the inside wall of the annular device. These reactive forces are applied through the combination of elongated member 17 and tracking wheels 15 and 16. As explained previously, tracking wheels 15 and 16 and bearing member 18 are independently and rotatably mounted on elongated member 17.

For purposes of analysis, forces applied to the deflecting means of FIG. 5 by cable 2 owing to vibratory motion imparted to the cable may be resolved into a horizontal force along a radius of annular device 12 hereinafter called a radial force and a horizontal force perpendicular thereto, hereinafter called a transverse force. Forces with only radial components or pure radial forces, which are directed toward or away from the center of annular device 12, are absorbed by bearing member 18 without causing any motion of the deflecting means. A condition in which the deflecting means is not moving can be considered an equilibrium condition. A transverse force disturbs such equilibrium by causing cable 2 to bear upon either rubbing strip 22 or 24 (FIG. 5). If sufficiently large, the transverse force creates a moment which cause the deflecting means to rotate or circumferentially shift within annular device 12 (FIG. 4).

To reduce static friction which might bind the equipment within annular device 12, a pair of guide wheels 21 and 26 (FIGS. 4 and 5) are used which bear upon the inside surface of annular device 12. Guide wheels 21 and 26 also assure that the deflecting means (FIG. 5) remains captured within the arcuate track of annular device 14 and does not fall out of engagement therewith.

As previously mentioned the center of cable 2 remains radially aligned with the center of bearing member 18. Since bearing member 18 maintains a constant spacing from the arcuate track in annular device 12 so will cable 2. Accordingly, the center of cable 2 maintains a constant spacing from the center of annular device 12. As should be evident from previous description, the locus of positions of the center of cable 2 is a circle. In the constructed embodiment this locus has a radius of 1 inch.

It is to be understood that as the center of cable 2 moves into different positions along its circular path substantially no forces are generated by the equipment which would tend to twist cable 2. This feature is assured by the fact that bearing member 18 is a wheel which can only provide forces which are essentially normal to the surface of collar 13. Furthermore rubbing strips 22 and 24 are formed from nylon which has a relatively small coefficient of friction so that any tangential frictional forces applied to the surface of collar 13 are relatively small and insufficient to twist cable 2, significantly.

If it is vibrating sufficiently, cable 2 causes the deflecting means (FIG. 4) to travel around arcuate track 14 in annular device 12. By moving, the deflecting means exerts restraining forces on cable 2 which damp the motion of the cable. First of all, frictional forces are produced by various moving parts such as bearing member 18 and tracking wheels 15 and 16, as well as guide wheels 21 and 26 (FIG. 5). Furthermore, frictional forces are produced by rubbing strips 22 and 24 which also damp the motion of cable 2. In addition, it is expected that the cable itself because it is urged by flexing into different positions by the movement of the deflecting means will exhibit a hysteresis phenomena which will further damp the motion of the cable. These damping effects can also be enhanced by using a suitable dense grease for lubricating wheels 15, 16, 21 and 26 and bearing member 18.

In the constructed embodiment, damping was increased by clamping protective members 10 (FIG. 3) around cable 2. Restraining member 11 comprising the bottom of enclosure 1 has a circular aperture formed therein encircling cable 2 and protective member 10. This circular aperture is concentrically aligned with the annular device mounted on base plate 5.

Cable 2 can vibrate and cause protective member 10 to move away from the inside surface provided by the aperture in restraining member 11. This motion will cause cable 2 to change the position of the deflecting means mounted on base plate 5 by causing the deflecting means to follow a circular path. Motion of cable 2 will also move protective member 10 into rubbing engagement with restraining member 11, thereby further damping the vibratory motion of the cable.

In the constructed embodiment, the damping of cable 2 was further enhanced by providing dashpot devices DD1 and DD2, illustrated in FIG. 6. Dashpot device DD1 is mounted to base plate 5 at a position disposed 90° with respect to dashpot device DD2. By using two dashpot devices, DD1 and DD2, it is not possible for cable 2 to move within annular device 12 in a direction which does not cause either plunger 27 or plunger 33 to move relative to cylinder body 28 or 34, respectively.

As mentioned earlier it is contemplated that any dashpot device which has the characteristic illustrated in graph 6A would be suitable. However, it may be desirable in some installations to use devices which have different characteristics. If this is the case, the dashpot selected should have a characteristic which takes into account the expected period of vibration of the relevant elevator cables. If the restraining force produced by the dashpot device is too small, the elevator cables will move freely but relatively small amounts of energy will be absorbed therefrom. If the restraining force is too large, the cable may move too slowly in the damping device of the invention so that the device does not function in the way intended. In determining if the cable can move with sufficient freedom consideration should be given to the fact that the period of cable vibration shortens as the length of cable shortens.

An alternate embodiment which provides damping is illustrated in FIG. 7. In this embodiment, the previously described annular device 12 is slidably mounted within annular support 41 with liquid medium FL entrapped between them to resist the devices' motion relative to its support. Since annular device 12 is movable laterally in support 41, its center can become somewhat misaligned with the terminating point of its cable. Since cable 2 is deflected by the previously described cable deflecting means, it produces a reactive force in the direction opposite to that in which it is deflected. When cable 2 is at rest this reactive force shifts annular device 12 in a direction which reduces the angle of deflection of cable 2. Because this angle of deflection is reduced, the length of cable between annular device 12 and the terminating point of cable 2 is reduced. This results in cable 2 being in its least deflected, lowest position.

If cable 2 is experiencing vibratory motion, the cable oscillates from one side of annular device 12 to the opposite side along the previously described circular path. Just before the cable transfers from one side of annular device 12 to the other, annular device 12 is misaligned due to the previously mentioned reactive force. Because this misalignment results in cable 2 being in its lowest or least deflected position, the cable must move upward in order to transfer within annular device 12 to a more deflected or higher position. Such upward movement converts part of the cable's kinetic energy into potential energy. After the cable moves upwardly in this manner and has transferred its position in annular device 12, the reactive force produced by cable 2 causes annular device 12 to shift its position within annular support 41 and reduce the angle of cable deflection. Reducing the angle of deflection in this manner lowers the cable to its least deflected position during which potential energy of the cable is absorbed by liquid medium FL. Once the cable has lowered it is in a condition to repeat another cycle.

FIG. 8 represents another embodiment of the present invention. This embodiment uses a two-tier arrangement in which the cable is restrained at two points: the coupling point at sleeve 61 and the coupling point at sleeve 80. As mentioned, the apparatus associated with the coupling point at sleeve 61 operates similarly to the previously described embodiments with the portion of cable 2' within sleeve 61 being constrained to follow a circular path. Accordingly, an embodiment using only the apparatus associated with sleeve 61 would be functionally equivalent to the previously described preferred embodiment.

In FIG. 8 cable 2' is constrained to follow a circular path by a rotor 57 which is mounted to an annular plate 56 by means of a ball bearing comprising inner race 54 and outer race 55. Since rotor 57 is free to rotate by means of the bearing assembly comprising races 54 and 55, points on rotor 57 are free to move in a circular path. The second upper circular aperture formed in rotor 57, which supports outer race 59 and inner race 60, is displaced ⅜ inch with respect to the center of the circular aperture formed in annular plate 56.

The lower assembly of the embodiment of FIG. 8 is arranged to allow cable 2' at sleeve 80 to move anywhere within a circle having a radius of ¾ inch. At sleeve 80 cable 2' moves as a result of either first hub 74 or second hub 77 rotating within its associated bearing. Since the center of the second lower circular aperture in first hub 74 is ⅜ inch from the center of the first lower circular aperture in plate 71 and since the center of the third lower circular aperture in second hub 77 is ⅜ inch from the center of the second lower circular aperture it follows that cable 2' at sleeve 80 is free to move anywhere within a circle having a radius of ¾ inch.

As illustrated in FIG. 8, cable 2' is displaced to the right in the Figure a maximum distance from the center of the aperture formed in plate 71. If it is assumed that inner race 76 does not move with respect to outer race 75, and if first hub 74 rotates within its bearing, the center of cable 2' at sleeve 80 will follow a circular path having a maximum radius of ¾ inch. If, alternatively, it is assumed that cable 2' at sleeve 80 is in a different position than that illustrated in FIG. 8, inner race 76 will be shifted with respect to outer race 75 and cable 2' at sleeve 80 will be closer to the center of the circular aperture formed in plate 71 than previously described. Under these circumstances, if first hub 74 rotates in its associated bearing without any relative movement in races 75 and 76, the center of cable 2' at sleeve 80 will follow a circular path having a radius less than the ¾ inch radius previously described.

Although the center of cable 2' at sleeve 80 is movable to any position within a ¾ inch radius, cable 2' at its point of engagement with sleeve 61 can move only in a circular path having a ⅜ inch radius.

Linkage means 81 connected between rotor 57 and hub 74 operates to move first hub 74 synchronously with rotor 57 so that they move through the same angle and the center of the second lower eccentric circular opening formed in first hub 74 remains vertically aligned with sleeve 61. Such alignment assures that the portion of cable 2' between sleeves 61 and 80 moves conically with an apex at sleeve 61. Since sleeve 61 and thus the apex of the cone can itself move, the result is that the portion of cable 2' within sleeve 80 is free to move throughout a horizontal plane bounded by a circle having a radius of ¾ inch as previously described. In this way the apparatus of FIG. 8 maintains that portion of cable 2' between sleeve 61 and sleeve 80 at a constant angle with respect to vertical. If cable position is defined with respect to sleeve 61, the portion of cable 2' between sleeve 61 and sleeve 80 is free to move through a conical surface. Since the portion of cable 2' between sleeves 61 and 80 maintains a constant angle with respect to vertical, the distance between these sleeves and the length of the cable therebetween does not change in response to vibratory motion of cable 2'.

It is noted that the lower portion of the apparatus shown in FIG. 8 includes two rotatable elements: first and second hubs 74 and 77. These provide two centers of rotation. Under certain conditions cable 2' can vibrate so as to align the center of cable 2' at sleeve 80 with the centers of rotation of first and second hubs 74 and 77. If cable 2' vibrates to produce forces at sleeve 80 which are also aligned with the above centers of rotation first and second hubs 74 and 77 will not tend to rotate. This can be avoided by preventing cable 2' from becoming so aligned. This can be accomplished by restricting the motion of bearings 75 and 76 to less than 180° of rotation. Rotation can be restricted by placing stops on hubs 74 and 77 to prevent further rotation.

The foregoing described mounting damping equipment underneath an elevator car is to protect the portion of the compensating cable between the bottom of the car and the compensating sheave whose length varies as the car moves. It is understood, however, that similar equipment could be mounted on top of a car to protect the portion of the hoisting cable between the top of the car and the drive sheave. Because of the higher loads on the hoisting cable, however, such equipment was not deemed necessary in the constructed embodiment. It is further understood that damping equipment could be mounted on the top or bottom of counterweight CW to protect the portions of cable from the counterweight to the drive or compensating sheave, respectively. However, these latter portions of cable can be conveniently constrained by cable guides which prevent excessively large cable vibration.

Various modifications to the foregoing arrangements will be evident to those skilled in the art and for that reason it is intended that the arrangements be considered illustrative only and not limiting in any sense.

What is claimed is:

1. A suspended cable apparatus for damping vibration of a cable suspended from a structure comprising:

mounting means attached to said structure and extending a given distance from said structure along the length of said cable; and a mechanism mounted on said mounting means and including cable deflecting means engaging said cable, said cable deflecting means when located in a predetermined position deflecting said cable from the longitudinal path in which it would be suspended in the absence of said cable deflecting means, said cable deflecting means being movable in response to cable vibration and controlling the portion of said cable at its location of engagement with said cable deflecting means to move in response to predetermined cable vibration with more motion than said portion would move in the absence of said cable deflecting means.

2. A suspended cable apparatus according to claim 1, wherein said mechanism further comprises:

an annular device having a shaped inside surface providing an arcuate track, said device being mounted on said mounting means and encircling said cable; said cable deflecting means being disposed in said annular device and movable around said arcuate track in response to cable vibration.

3. A suspended cable apparatus according to claim 2, wherein said arcuate track is disposed in a plane substantially perpendicular to the longitudinal path in which said cable would be suspended at the location of said cable deflecting means in the absence of said cable deflecting means.

4. A suspended cable apparatus according to claim 3, wherein said longitudinal path is in the vertical direction and said arcuate track is disposed in a substantially horizontal plane.

5. A suspended cable apparatus according to claim 4, wherein said cable deflecting means comprises:

a guide frame engaging said arcuate track and being movable therearound in response to cable vibration; and a bearing member rotatably mounted on said guide frame bearing against said cable and rolling around said cable when said guide frame moves around said arcuate track.

6. A suspended cable apparatus according to claim 5, wherein said guide frame comprises:

a supporting plate supporting said bearing member; said supporting plate and said bearing member being spaced from said arcuate track; and a tracking wheel rotatably mounted on said supporting plate and rolling in said arcuate track when said guide frame moves around it.

7. A suspended cable apparatus according to claim 6, wherein said arcuate track is circular and wherein said guide frame further comprises:

an elongated member perpendicularly mounted on said supporting plate and shaped to provide inner and outer axles having spaced parallel axes, said outer axle being disposed nearer to said arcuate track than said inner axle, said inner axle supporting said bearing member, said outer axle supporting said tracking wheel; and a pair of guide wheels rotatably mounted on said supporting plate to rotate around spaced parallel axes perpendicular to said supporting plate, each guide wheel rolling on said arcuate track at separate positions, each position being circumferentially displaced along said arcuate track from said tracking wheel.

8. A suspended cable apparatus according to claim 7, further comprising:

damping means attached to said mounting means, said damping means including:

a protective member attached to and surrounding a portion of said cable located a given distance from said annular device in the direction away from said structure; and a restraining member having an aperture and being mounted on said mounting means, said restraining member being spaced from said mounting means with its aperture encircling said protective member to enable it to rub against the sides of said aperture when said cable experiences predetermined vibratory motion.

9. A suspended cable apparatus according to claim 8, wherein said damping means comprises:

a dashpot device having a pair of relatively movable members, one of said pair of members being coupled to said cable and the other being attached to said mounting means, said dashpot operating to produce a restraining force resisting relative motion of said pair of members.

10. A suspended cable apparatus according to claim 2, wherein said mounting means includes an annular support and said annular device has a circumferential groove formed on its outer surface, said apparatus further including:

a liquid medium, and an annular cup member mounted to encircle said annular device and having a shaped lower inside surface forming a seal with said annular device below said circumferential groove, said annular cup member having an upper inside surface spaced from said annular device to form an annular reservoir therewith, said annular support having a lip portion extending into said circumferential groove, said circumferential groove being dimensioned with respect to said lip to permit said annular device to be slidably movable in relation to said annular support in response to cable vibration; said liquid medium being disposed in said reservoir whereby relative motion of said annular device with respect to said annular support is resisted by said liquid medium.

11. A suspended cable apparatus according to claim 5, wherein said annular device has a horizontal surface with a first upper circular aperture and wherein said guide frame comprises:

a rotor rotatably mounted in said first upper circular aperture and having a second upper circular aperture eccentric with said first circular aperture, said bearing member including a ball bearing assembly including an inner and outer race mounted in said second upper circular aperture and a sleeve surrounding said cable, said sleeve engaging said inner race.

12. A suspended cable apparatus according to claim 11, further comprising:

a horizontal mounting platform having a first lower circular aperture and mounted a given distance below said mounting means;

a first hub rotatably mounted in said first lower circular aperture, said first hub having a second lower circular aperture eccentric to said first lower circular aperture;

a second hub rotatably mounted in said second lower circular aperture, said second hub having a third lower circular aperture eccentric to said second lower circular aperture, said cable being suspended through said third lower circular aperture; and linkage means linking said first hub and said rotor causing them to rotate synchronously.

* * * * *

UNITED STATES PATENT OFFICE

CERTIFICATE OF CORRECTION

PATENT NO. : 4,072,213

DATED : February 7, 1978

INVENTOR(S) : John Kennedy Salmon

It is certified that error appears in the above-identified patent and that said Letters Patent are hereby corrected as shown below:

Col. 6, Line 26 - After outer,"axis" should be --axles--.

Col. 6, Line 44 - After outside,"surfaces" should be --surface--.

Signed and Sealed this

Sixteenth Day of May 1978

[SEAL]

Attest:

RUTH C. MASON
*Attesting Officer*

LUTRELLE F. PARKER
*Acting Commissioner of Patents and Trademarks*